United States Patent [19]
Bierwirth

[11] Patent Number: 5,255,294
[45] Date of Patent: Oct. 19, 1993

[54] SEALING DEVICE FOR CYLINDRICAL HOLLOW BODIES WITH AN OPENING AT AN END FACE, ESPECIALLY FOR SEALING PUMP SOCKETS IN THE INTERIOR OF REACTOR CONTAINERS

[75] Inventor: Helmut Bierwirth, Kassel, Fed. Rep. of Germany

[73] Assignee: Thyssen Industrie AG, Essen, Fed. Rep. of Germany

[21] Appl. No.: 850,437

[22] Filed: Mar. 12, 1992

[30] Foreign Application Priority Data

Mar. 13, 1991 [DE] Fed. Rep. of Germany ....... 4108055

[51] Int. Cl.$^5$ .......................................... G21C 13/028
[52] U.S. Cl. ........................................ 376/204; 138/89
[58] Field of Search ................... 376/204, 203, 463; 138/89, 103

[56] References Cited

U.S. PATENT DOCUMENTS

| | | | |
|---|---|---|---|
| 4,262,702 | 4/1981 | Streich | 138/89 |
| 4,769,207 | 9/1988 | Weber et al. | 376/204 |

FOREIGN PATENT DOCUMENTS 3228802  8/1986  Fed. Rep. of Germany .

*Primary Examiner*—Daniel D. Wasil
*Attorney, Agent, or Firm*—Robert W. Becker & Associates

[57] ABSTRACT

A sealing device for cylindrical hollow bodies of a small diameter has a cylindrical sealing insert with two coaxially arranged, axially displaceable members and an elastic sealing ring disposed between the two members. A displacement of the two coaxial members towards one another results in an enlargement of an outer diameter of the sealing ring and contact pressure between the outer circumference of the sealing ring and the inner wall surface of the hollow body. A remote-controlled placing tool is connectable to the sealing insert for clamping and locking the sealing insert in a sealing position and for releasing the sealing insert therefrom. The tool has a clamping cylinder with a clamping piston and a clamping piston rod in the form of a hollow cylinder connected to the clamping piston. A clamping anchor is connected to the first coaxial member and a sleeve is connected coaxially and axially slidable about the anchor. The tool is further provided with a release cylinder with a release piston. The sleeve is actuatable by the release piston when the tool is connected to the sealing insert. A supporting body connected to the release piston has radially pivotable release hooks that engage a flange of the sleeve for axially sliding the sleeve. The tool has radially pivotable pawls that are connected to the clamping piston rod for engaging a head of the anchor and an axially slidable control slide for pivoting the release hooks and the pawls.

6 Claims, 7 Drawing Sheets

5,255,294

SEALING DEVICE FOR CYLINDRICAL HOLLOW BODIES WITH AN OPENING AT AN END FACE, ESPECIALLY FOR SEALING PUMP SOCKETS IN THE INTERIOR OF REACTOR CONTAINERS

BACKGROUND OF THE INVENTION

The present invention relates to a sealing device for cylindrical hollow bodies with an opening at an end face, especially for sealing pump sockets in the interior of reactor containers, whereby the sealing device is essentially comprised of two components, a cylindrical sealing insert and a placing tool.

Sealing devices of the aforementioned kind are preferably employed in nuclear plants and reactors during controlling and servicing procedures, especially for sealing, respectively, separating liquid circuits in reactors. The special suitability of such devices is primarily based on the remote controllability so that exposure to radiation and endangerment of operating personnel is prevented. Furthermore, a reliable sealing of the respective opening, even when the placing tool is separate from the sealing insert, is provided with these devices. The sealing devices of the aforementioned kind furthermore provide the possibility to remove the sealing inserts with the placing tool.

Such a demountable and remountable sealing device for pipes is, for example, known from U.S. Pat. No. 4,769,207, especially for sealing the socket of the primary coolant of a reactor pressure container. The sealing device of the prior art is comprised of a cylindrical sealing insert with at least one sealing ring and an operating device (placing tool) for transporting, inserting and demounting the sealing insert. For positioning the sealing insert in the operating device, the operating device is inserted with the aid of roller arms into the inner one of two coaxially arranged sealing insert members which are axially slidable relative to one another. The connection between the sealing insert and the operating device is accomplished by moving locking bolts of a sliding disk of the operating device radially outwardly, so that the bolts engage openings of the sealing insert.

It is a disadvantage of the known sealing devices that, due to the space requirements of the operating device that must be inserted into the interior of the sealing insert, only pipes of a relatively great diameter may be sealed.

it is furthermore disadvantageous that the coupling of the sealing insert and the operating device via bolts engaging respective openings requires an exact positioning of the components with respect to their rotational position relative to one another which, especially in remote controlling and in underwater applications, makes the coupling of the sealing insert more difficult.

It is therefore an object of the present invention to provide a sealing device of the aforementioned kind with which openings of cylindrical hollow bodies having a small diameter may be sealed reliably and with which the insertion of the operating device, respectively, placing tool is possible independent of the relative rotational position of the two components.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
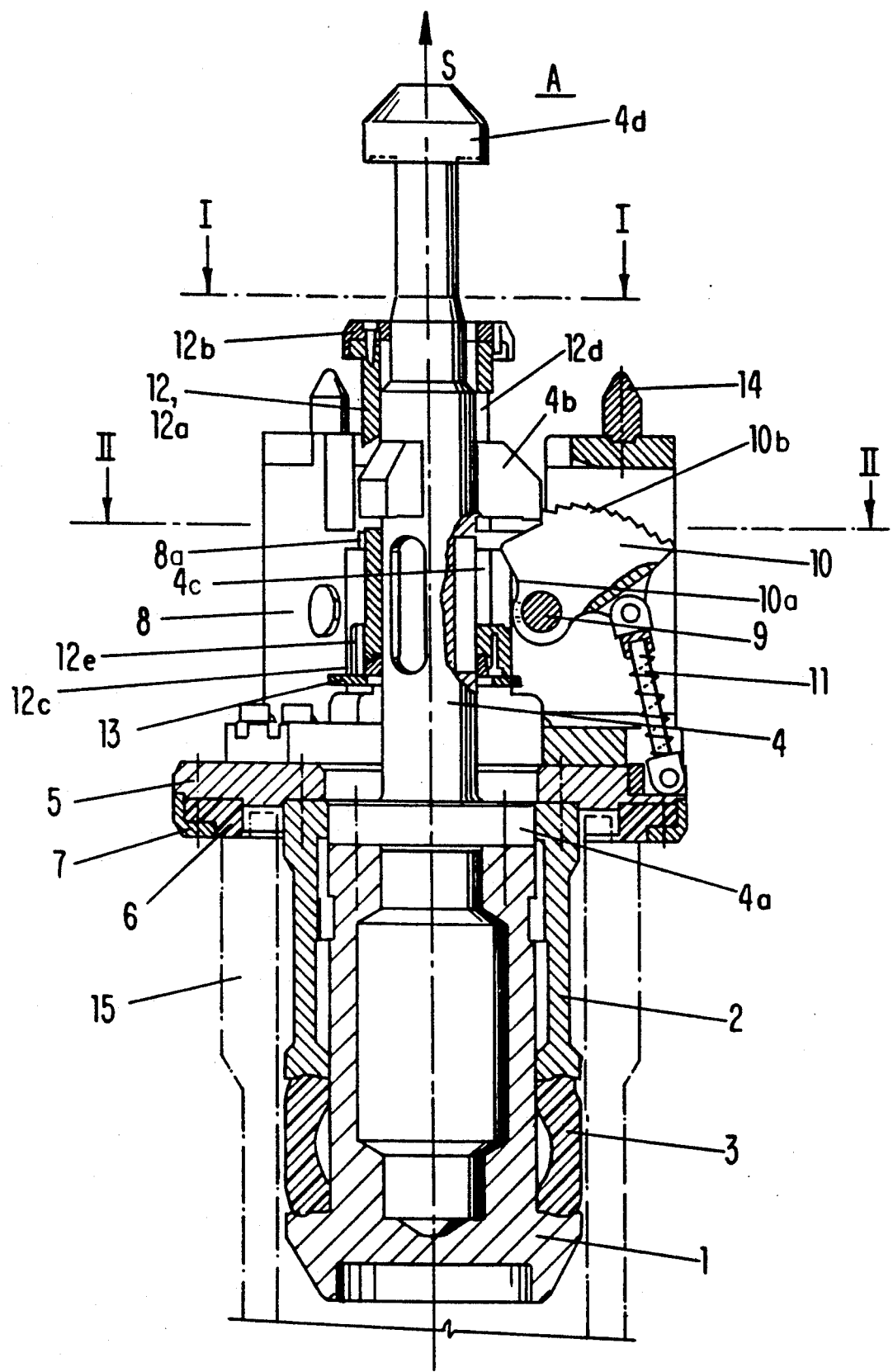
FIG. 1 is a longitudinal sectional view of a released sealing insert A.

The sealing device of the present invention is primarily characterized by a cylindrical sealing insert comprising two coaxially arranged, axially displaceable members and an elastic sealing ring disposed between the two coaxially arranged members such that a displacement of the two coaxially arranged members toward one another results in an enlargement of an outer diameter of the sealing ring, leading to a contact pressure between an outer circumference of the sealing ring and an inner wall surface of the cylindrical hollow body; a placing tool that is remote-controlled and detachably connected to the sealing insert, for clamping and locking the sealing insert in a sealing position as well as releasing the sealing insert from the sealing position, the placing tool comprising a clamping cylinder, a clamping piston slidably connected to the clamping cylinder, and a clamping piston rod, the clamping piston rod being in the form of a hollow cylinder connected to the clamping piston; the sealing insert further comprising a clamping anchor having a head, the clamping anchor being connected to a first one of the coaxially arranged members, and a sleeve connected coaxially and axially slidable about the clamping anchor; the placing tool further comprising a release cylinder and a release piston connected to the release cylinder, the sleeve having a first flange at an upper end thereof and being actuatable by the release piston; the placing tool further comprising a supporting body connected to the release piston and radially pivotable release hooks attached to the supporting body, the release hooks engaging the first flange of the sleeve for axially sliding the sleeve; and the placing tool further comprising radially pivotable pawls connected to the clamping piston rod engaging the head of the clamping anchor, and a control slide connected in an axially slidable, non-rotatably guided manner to the clamping piston rod for pivoting the release hooks and the pawls, the supporting body being axially guided at the clamping piston rod in a non-rotatable manner.

It is an advantage of the present invention that the sealing device provides a reliable sealing of cylindrical hollow bodies of smaller diameters and that the connection of the sealing insert and the placing tool is possible in any randomly occurring relative rotational position of the two components (sealing insert and placing tool).

The transmission of great clamping forces, with which a great degree of sealing may be achieved, in general requires an undivided clamping anchor. The following embodiment of the present invention allows such a transmission. The sleeve in this embodiment is comprised of a plurality of parts, whereby the parts are assembled about the clamping anchor and connected to form the sleeve as a rigid body. Preferably, the parts include three glide pieces and two radially divided flanges.

In another embodiment of the present invention, the second one of the coaxially arranged members comprises an annular disk and a seal that is connected to the annular disk at a side of it that is facing the sealing ring. With this embodiment a reliable sealing with low clamping forces is possible, and the end face of the opening of the cylindrical hollow body, for example, the flange surface of a pump socket, is protected against damage.

It is expedient that the placing tool further comprises an annular body connected to the release piston, the annular body having guide means for the release hooks and the pawls at an outer mantle surface thereof and having guide ribs extending radially inwardly for receiving and centering the clamping anchor. With this embodiment an undesireably high load of the pivot joints of the pawls and the release hooks is prevented which, for example, might occur due to transverse forces created when a sealing insert and placing tool of a great mass are coupled. This embodiment is further more preferred for arresting the centering the placing tool at the sealing insert.

It is advantageous that the sealing insert further comprises ratchets and bearing blocks, whereby the bearing blocks are connected to the annular disk and the ratchets are pivotably connected to the bearing blocks. The sealing insert is released from the sealing position by sliding the sleeve in a direction of clamping, resulting in a radially outwardly directed pivoting of the ratchets. With this embodiment, a transport of the sealing insert at the sleeve which is supported at the bearing blocks is carried out in the released and unloaded state of the sealing insert so that the sealing ring is released and unloaded by the mass of the outer member of the sealing insert. This allows a simple insertion of the sealing insert into the cylindrical hollow body.

DESCRIPTION OF PREFERRED EMBODIMENTS

The present invention will now be described in detail with the aid of the specific embodiment represented in FIGS. 1 through 11.

As can be seen in FIG. 1 the sealing insert A is comprised of two coaxially arranged, axially displaceable members 1, 2. The first coaxially arranged member 1 is essentially a plug core and the second coaxially arranged member 2 is essentially a plug mantle. Between oppositely arranged shoulder surfaces of the plug core 1 and the plug mantle 2 a sealing ring 3 is disposed. The plug core 1 is connected to a clamping anchor 4 by screws that are positioned about the periphery of the clamping anchor flange 4a. Furthermore, the plug mantle 2 is connected to an annular disk 5 which is provided with a seal 6 facing the sealing ring 3. The position of the seal 6 is fixed by a securing ring 7 that engages recesses of the seal 6 and of the annular disk 5. On the side of the annular disk 5 that is opposite the seal 6, a plurality of bearing blocks 8 are connected to the annular disk 5; in the represented embodiment three such bearing blocks 8 are provided. The bearing blocks 8 are provided with pivotable multi-stepped ratchets 10 which are driven by spring legs 11 and, when the clamping anchor 4 is moved in the clamping direction S, engage projections 4b provided at the periphery of the clamping anchor 4, so that thereby an automatic resetting of the clamping anchor 4 into its initial position, caused by the prestressed sealing ring 3, is prevented. A sleeve 12 is coaxially arranged about the clamping anchor 4 and is slidable in an axial direction.

Figure 2:
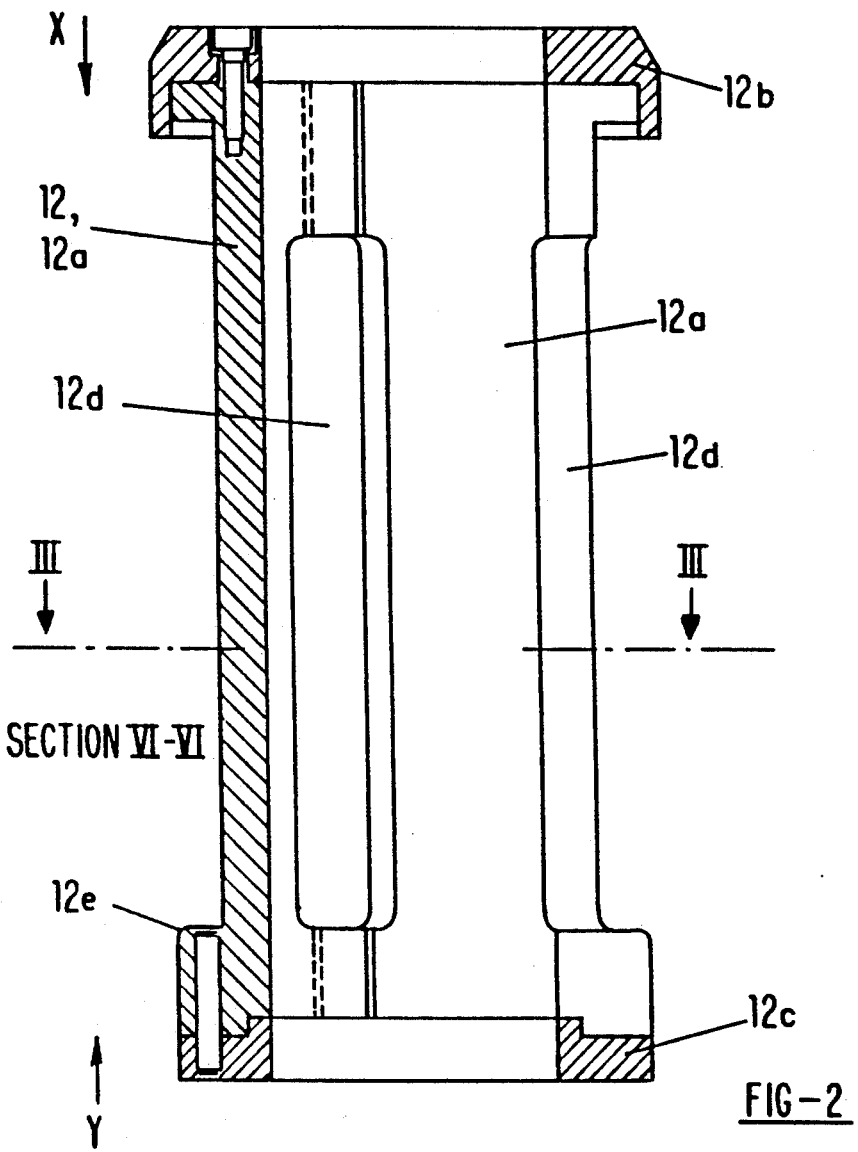
FIG. 2 shows the sleeve of the sealing insert A in an enlarged longitudinal sectional view.
Figure 3:
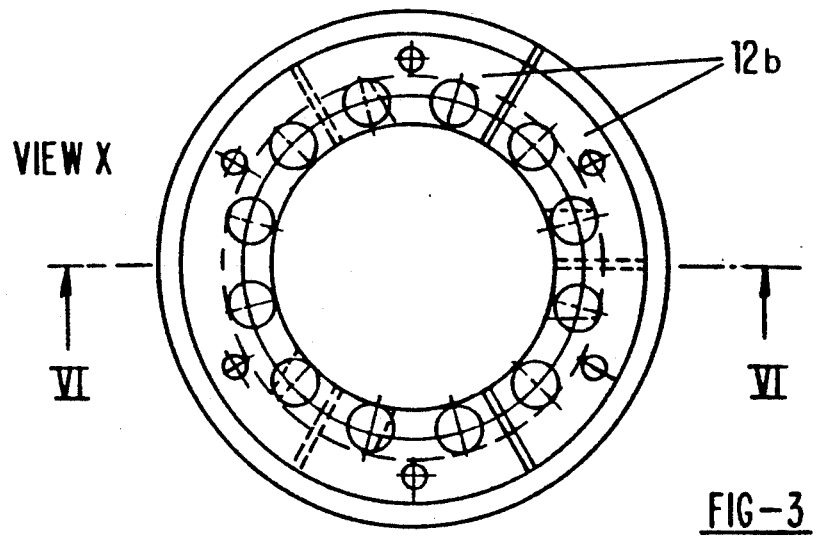
FIG. 3 shows the upper, radially divided flange of the sleeve.
Figure 4:
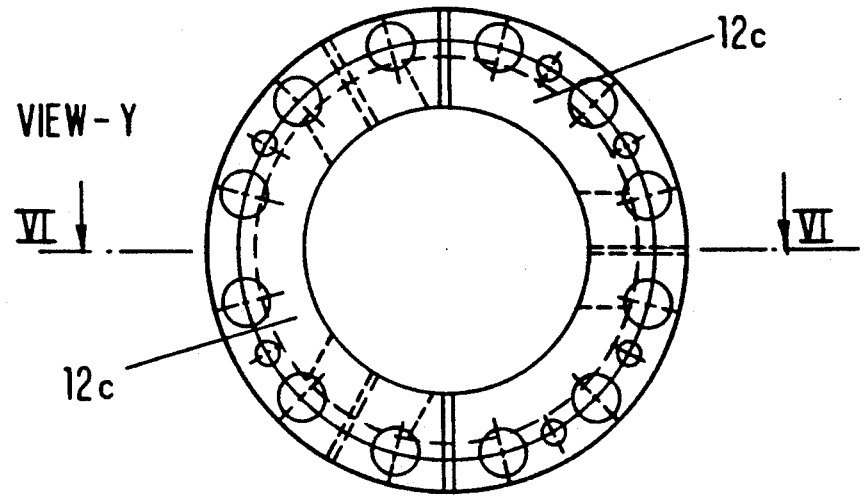
FIG. 4 shows the lower flange of the sleeve which is divided differently than the flange of FIG. 3.
Figure 5:
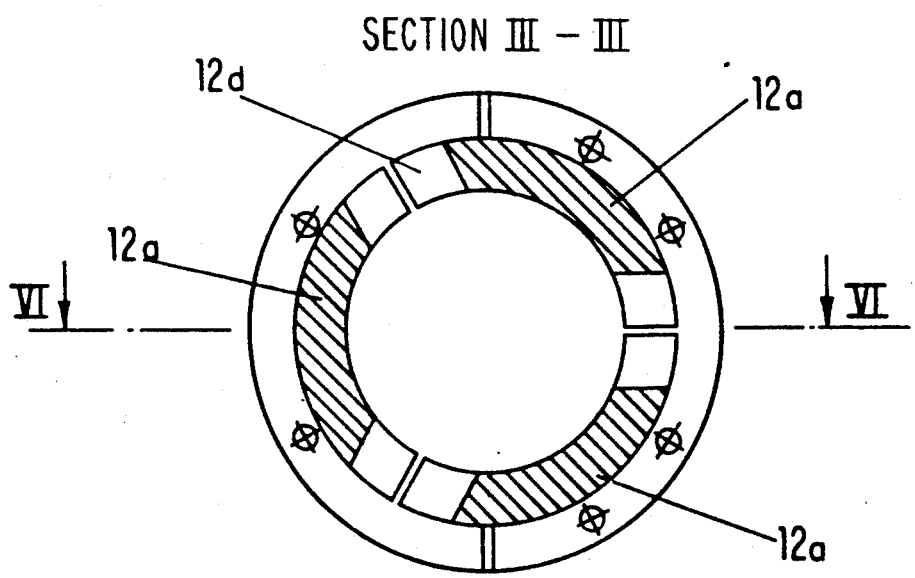
FIG. 5 is a cross-sectional view of the sleeve along the line III' of FIG. 2.
Figure 6:
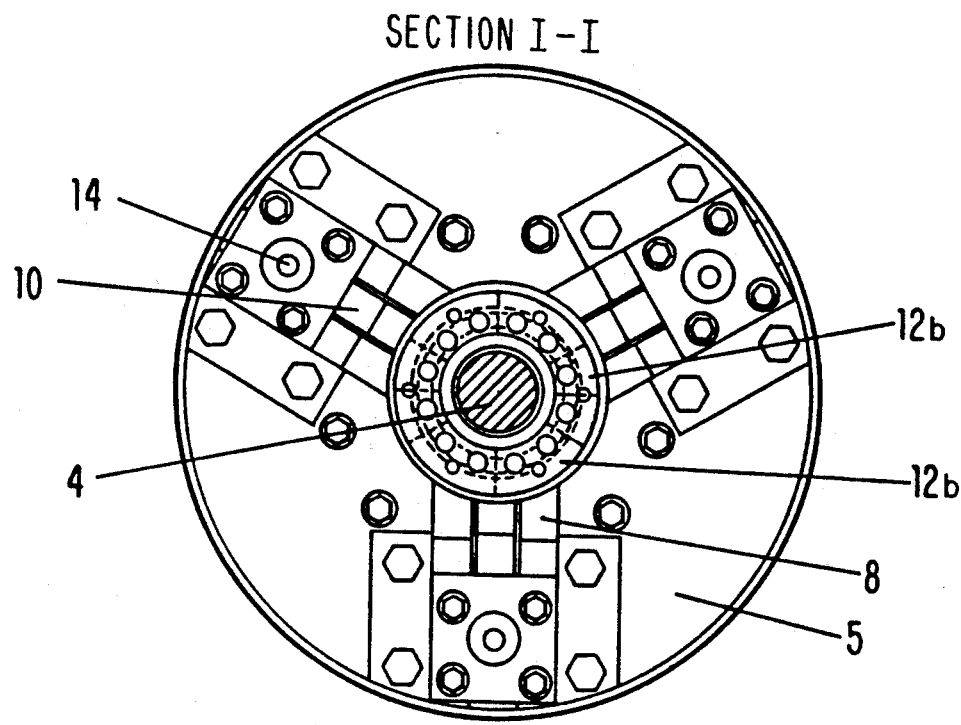
FIG. 6 is a cross-sectional view of the sealing insert A along the line II' of FIG. 1.
Figure 7:
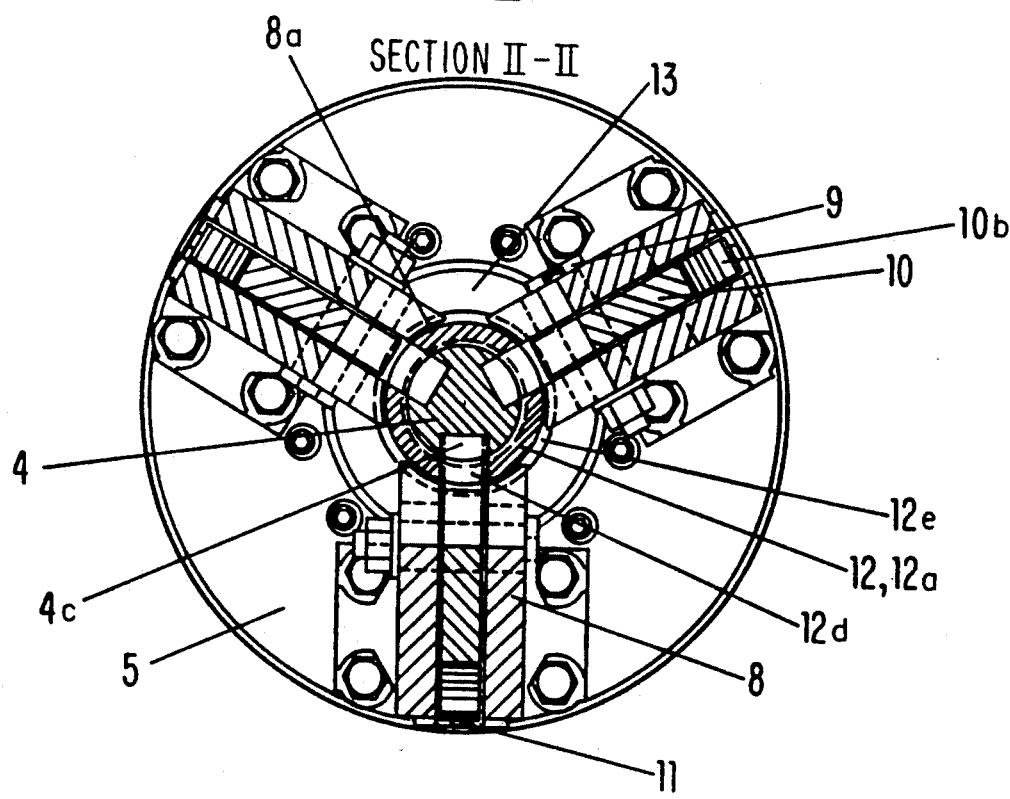
FIG. 7 shows a cross-sectional view of the sealing insert A along the ling II—II' of FIG. 1.

As can be seen in FIG. 2 in connection with FIGS. 3, 4 and 5, the sleeve 12 is comprised of three gliding pieces 12a which are connected by screws to upper and lower flanges 12b, 12c, thus forming a rigid body. The flanges 12b and 12c are radially divided such that mounting of all parts of the sleeve 12 about the clamping anchor 4 is possible (FIGS. 3, 4, 6). In the assembled state the sleeve 12 is provided with slotted holes 12d through which the radially outwardly oriented projections 4b of the clamping anchor 4 protrude. The gliding pieces 12a are further provided with outer collar members 12e. When the sleeve 12 is moved in the clamping direction S of the clamping anchor 4, as can be seen in FIG. 1, the outer collar members 12e press against gliding surfaces 10a of the ratchets 10 so that a radially outwardly oriented pivoting movement of the ratchets 10 is initiated. When the ratchets 10 are in a unstressed position, i.e., the clamping force of the clamping anchor 4 is transmitted to the bearing blocks 8 or the annular disk 5, only the spring force of the spring legs 11 must be overcome to initiate the outward pivoting of the ratchets 10.

When the clamping anchor 4 is moved in the clamping direction S and the sleeve 12 is moved in the opposite direction, the ratchets 10 pivot radially inwardly, driven by the spring legs 11, and engage with their gliding surfaces 10a and first ratchet steps 10b the slotted holes 12d of the sleeve 12 and the recesses 4c of the clamping anchor 4. The displacement of the sleeve 12 is limited by the spacer 13, used to position the bearing blocks 8, and by the abutments 8a of the bearing blocks 8. In the end position of the sleeve 12, in which the outer collar members 12e of the sleeve 12 are contacting the abutments 8a of the bearing blocks 8 (FIGS. 1, 7), a transport of the sealing insert A may be carried out without any force being exerted onto the sealing ring 3, whereby the placing tool B, which will be described in detail in the following paragraphs, engages the upper flange 12b of the sleeve 12 and rests at the bearing blocks 8.

Figure 8:
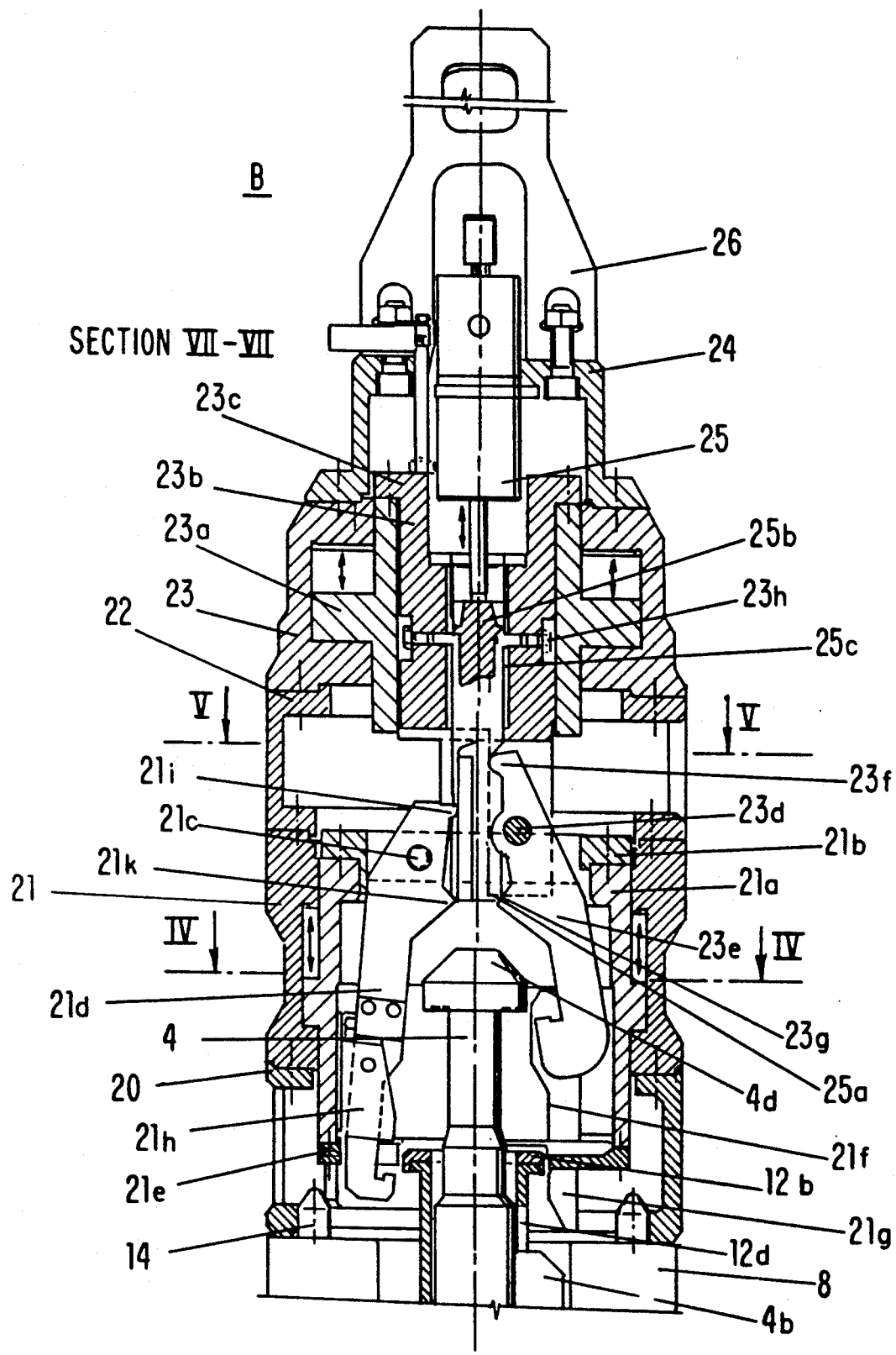
FIG. 8 is a longitudinal cross-sectional view of the placing tool B which is resting on the bearing blocks of the sealing insert A.
Figure 9:
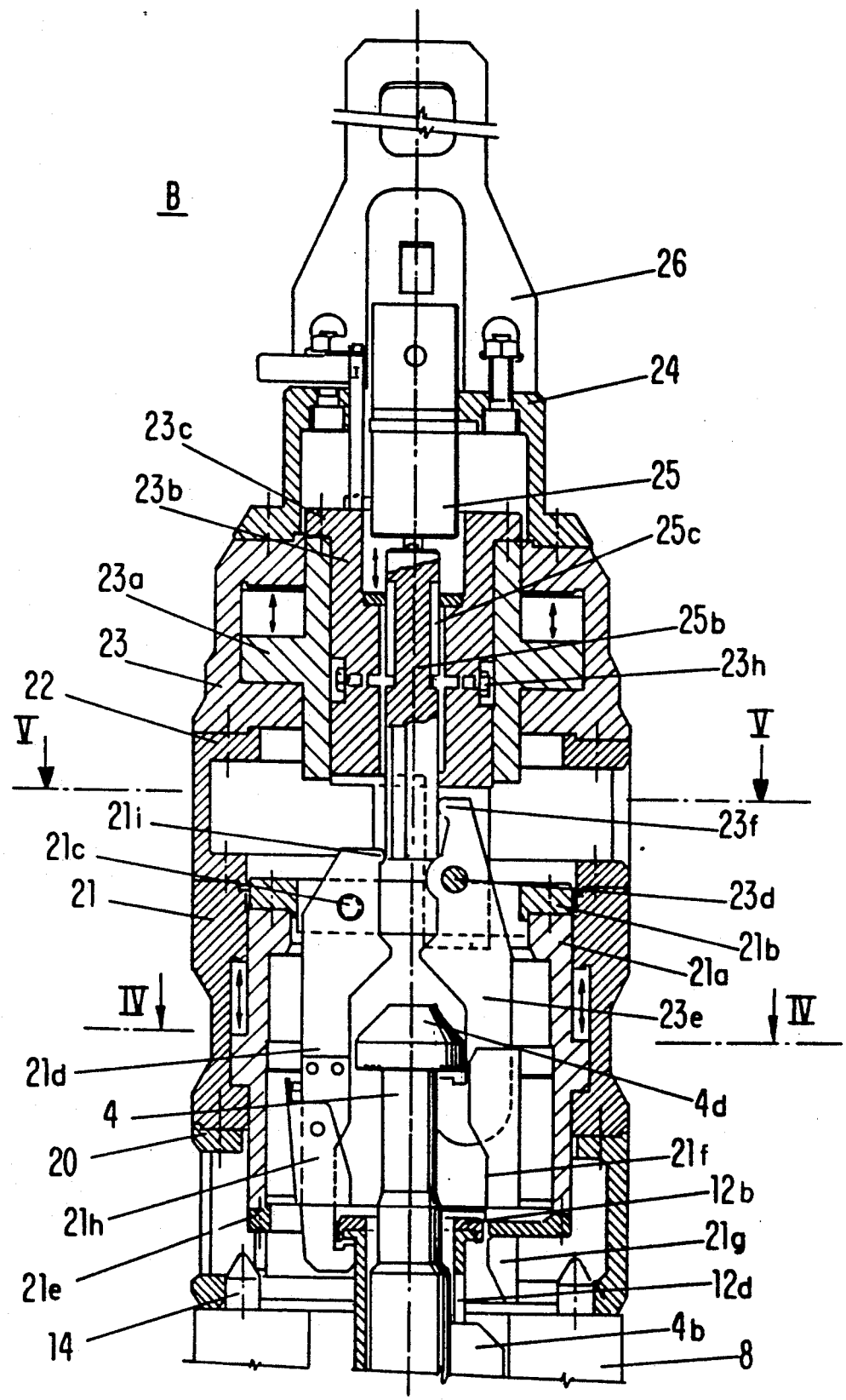
FIG. 9 is the placing tool B according to FIG. 8 with radially inwardly pivoted pawls and release hooks.

The placing tool B which serves to operate the sealing insert A is described in FIGS. 8 and 9. The following components essentially form the housing: A centering ring 20, a release cylinder 21, an intermediate ring 22, a clamping cylinder 23, and an end piece 24. These components are interconnected by screws.

The clamping cylinder 23 is provided with a clamping piston 23a in the form of a hollow cylinder to which a clamping piston rod 23b with a collar 23c is connected. Two bolts 23d are connected to the clamping piston rod 23b and support two radially pivotable pawls 23e.

Figure 10:
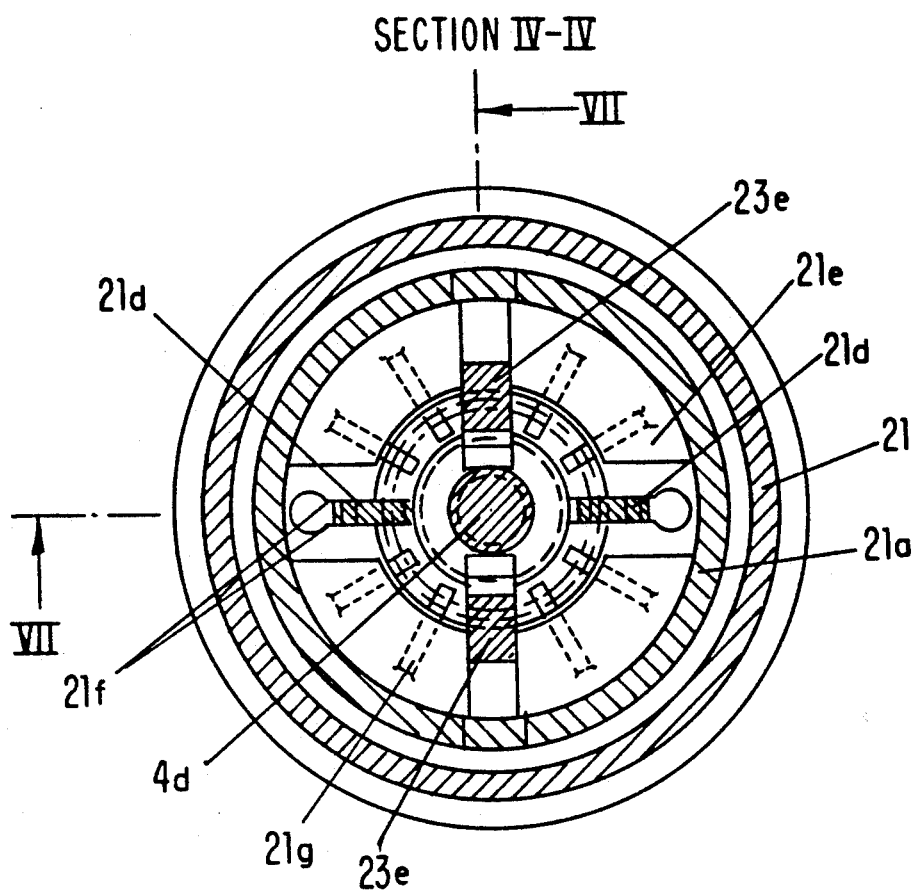
FIG. 10 is a cross-sectional view of the placing tool B along the line IV—IV' of FIG. 8.

The release piston 21a of the release cylinder 21 is provided with a support body 21b which has connected thereto release hooks 21d that are radially pivotably supported at two bolts 21c. Furthermore, the release piston 21a is connected to an annular body 21e, the outer mantle surface of which is provided with guide means 21f for the pawls 23e and the release hooks 21d. Radially inwardly extending guide ribs 21g are provided at the annular body 21e for receiving and centering the clamping anchor 4 of the sealing insert A (FIG. 10). The release hooks 21d are provided with a pivotable bar 21h. When the release hooks 21d are pivoted inwardly, the bar 21h rests at the circumference of the flange 12b of the sleeve 12. When the flange 12b is entirely engaged by the release hooks 21d, the bar 21h is locked at the flange 12b.

Figure 11:
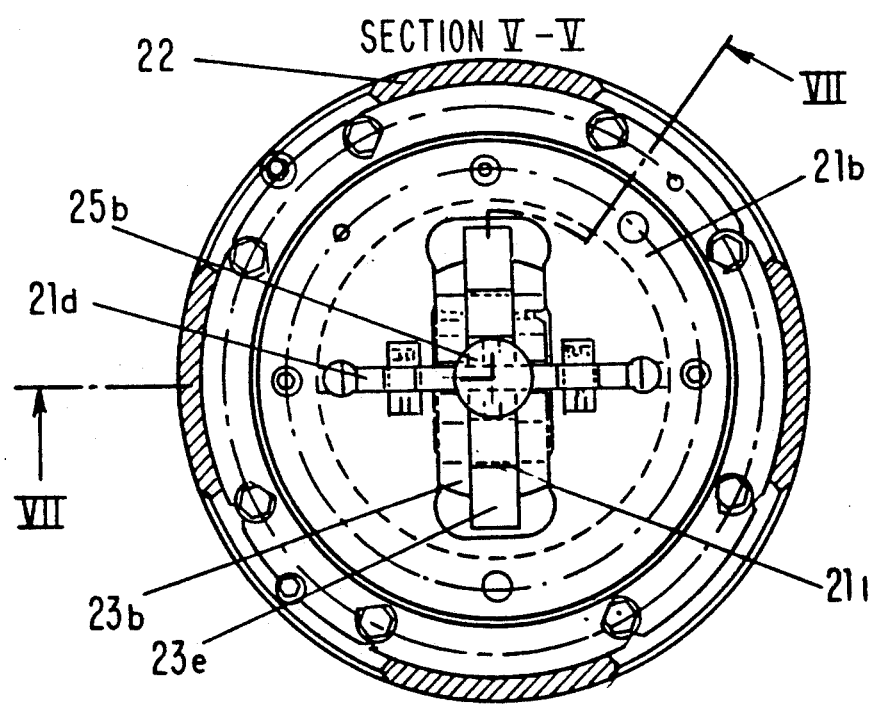
FIG. 11 is a cross-sectional view of the placing tool B along the line V—V' in FIG. 8.

The end piece 24 has a control cylinder 25 for displacing in an axial direction a control slide 25b with cogs 25a in the interior of the clamping piston rod 23b. Upon moving the control slide 25b, the pawls 23e and the release hooks 21d, gliding with their ends 23f, 21i and control cams 23g, 21k on the control slide 25b, are radially pivoted. The pawls 23e are secured against rotation relative to the control slide 25b by a screw bolt 23h connected to the clamping piston rod 23b and engaging axial slots 25c of the control slide 25b. A similar securing device is provided for the release hooks 21d whereby the clamping piston rod 23b of the clamping piston 23a is axially guided in a recess 21l of the interior of the supporting body 21b of the release piston 21a (FIG. 11).

The end piece 24 is furthermore provided with a lifting eye 26 and hydraulic couplings which are not represented in the drawing. The hydraulic couplings are used to connect hydraulic hoses of an operating panel for actuating the clamping cylinder 23, the release cylinder 21, and the control cylinder 25 to hydraulic lines of the placing tool B. The hydraulic lines are placed into grooves at the surface of the placing tool B so that the lines are protected against damage and the tool is provided with a smooth outer surface area.

In the following the cooperation of the sealing insert A and the placing tool B during the sealing of a liquid-filled container with a vertically extending pump socket 15 will be explained.

The sealing insert A is positioned in a storage unit with the clamping anchor 4 pointing in an upward direction. The placing tool B which is suspended from the lifting eye 26 is lowered onto the sealing insert A. The release hooks 21d and the pawls 23e of the placing tool B are pivoted outwardly, actuated by the control slide 25b. The head 4d of the clamping anchor 4 is inserted into the guide ribs 21g of the annular body 21e, resulting in a pre-centering of the placing tool B. The final centering is accomplished when the centering ring 20 contacts the bearing blocks 8 and, in the radial direction, the outer circumference of the centering bolts 14 (FIG. 8). Subsequently, the pawls 23e and the release hooks 21d are pivoted inwardly so that the pawls 23e engage the head 4d of the clamping anchor 4 and the release hooks 21d engage the upper flange 12b of the sleeve 12 (FIG. 9). The upwardly oriented lift of the release piston 21a results in a displacement of the sleeve 12 against the abutments 8a of the bearing blocks 8. Connected to the placing tool B in such a manner, the sealing insert A is removed from the storage unit and inserted into the pump socket 15 so that the seal 6 of the sealing insert A contacts the flange surface of the pump socket 15 (FIG. 1).

In preparing for the sealing procedure the release piston 21a is moved downward. The sleeve 12 follows this movement due to the effect of gravity, respectively, due to the pressure exerted onto the upper flange 12b of the sleeve 12 by the spring-loaded bars 21h of the release hooks 21d. Now a radially inwardly oriented pivoting of the ratchets 10 upon displacement of the clamping anchor 4 in the clamping direction S as is possible.

In order to seal the pump socket 15, the clamping anchor 4 is moved in the clamping direction S by the upwardly oriented lift of the clamping piston 23a whereby the centering ring 20 of the placing tool B is supported at the bearing blocks 8. The clamping force which is transmitted onto the sealing ring 3 results in a sealing contact pressure of the outer circumference of the sealing ring 3 at the inner wall surface of the pump socket. At the same time, a reaction force, which is oppositely oriented relative to the clamping direction S of the clamping anchor 4, is transmitted from the sealing ring 3 onto the axially acting seal 6, whereby a greater sealing force of the seal 6 is accomplished, as compared to an exclusively hydrostatic force. The clamping piston 23a may now be moved in a downward direction since the clamping state of the sealing insert A is maintained due to the locking force of the ratchet 10. The axial movement of the control slides 25b causes the release hooks 21d and the pawls 23e to be pivoted outwardly. Subsequently, the placing tool B may be lifted and removed from the sealing insert A.

For the removal of the sealing insert A from the pump socket 15, after the aforedescribed steps of inserting and centering the placing tool B and inwardly pivoting the release hooks 21d and the pawls 23e, the clamping piston 23a must be moved in the clamping direction S to such an extent that the ratchets 10 are unloaded. Due to the upward movement of the release piston 21a, the ratchets 10 are moved outwardly at the sleeve 12. Accordingly, the sealing insert A is freed and, when the clamping piston 23a is moved downward, it is released and may be removed from the pump socket 15. The detachment of the sealing insert A from the placing tool B is possible after displacing the sleeve 12 in an upward direction and pivoting the release hooks 21d and the pawls 23e outwardly.

The inventive sealing device is suitable for liquids, but is also applicable for sealing, respectively separating gaseous media.

The present invention is, of course, in no way restricted to the specific disclosure of the specification and drawings, but also encompasses any modifications within the scope of the appended claims.

What I claim is:

1. A sealing device for cylindrical hollow bodies with an opening at an end face, comprising:
   a cylindrical sealing insert comprising two coaxially arranged, axially displaceable members and an elastic sealing ring disposed between said two coaxially arranged members such that a displacement of said two coaxially arranged members toward one another results in an enlargement of an outer diameter of said sealing ring, leading to a contact pressure between an outer circumference of said sealing ring and an inner wall surface of said cylindrical hollow body;
   a placing tool, that is remote-controlled and detachably connected to said sealing insert, for clamping and locking said sealing insert in a sealing position as well as releasing said sealing insert from said sealing position, said placing tool comprising a clamping cylinder, a clamping piston slidably connected to said clamping cylinder, and a clamping piston rod, said piston rod being in the form of a hollow cylinder connected to said clamping piston;

said sealing insert further comprising a clamping anchor having a head, said clamping anchor being connected to a first one of said coaxially arranged members, and a sleeve connected coaxially and axially slidable about said clamping anchor;

said placing tool further comprising a release cylinder and a release piston connected to said release cylinder, said sleeve having a first flange at an upper end thereof and being actuatable by said release piston;

said placing tool further comprising a supporting body connected to said release piston and radially pivotable release hooks attached to said supporting body, said release hooks engaging said first flange for axially sliding said sleeve; and said placing tool further comprising radially pivotable pawls connected to said clamping piston rod for engaging said head of said clamping anchor, and a control slide connected in an axially slidable, non-rotatably guided manner to said clamping piston rod for pivoting said release hooks and said pawls, said supporting body being axially guided at said clamping piston rod in a non-rotatable manner.

2. A sealing device according to claim 1, wherein said sleeve is comprised of a plurality of parts, said parts being assembled about said clamping anchor and connected to form said sleeve as a rigid body.

3. A sealing device according to claim 2, wherein said parts include three glide pieces and two radially divided flanges.

4. A sealing device according to claim 1, wherein a second one of said coaxially arranged members comprises an annular disk and a seal connected to said annular disk at a side of said annular disk facing said sealing ring.

5. A sealing device according to claim 4, wherein said sealing insert further comprises ratchets and bearing blocks, said bearing blocks being connected to said annular disk and said ratchets being pivotably connected to said bearing blocks, with said sealing insert being released from said sealing position by sliding said sleeve in a direction of clamping, resulting in a radially outwardly directed pivoting of said ratchets.

6. A sealing device according to claim 1, wherein said placing tool further comprises an annular body connected to said release piston, said annular body having guide means for said release hooks and said pawls at an outer mantle surface thereof and having guide ribs extending radially inwardly for receiving and centering said clamping anchor.

* * * * *